Nov. 5, 1963　　　　C. E. RECKNOR ETAL　　　　3,109,503
WEIGHING AND MEASURING APPARATUS FOR GRANULAR
AND THE LIKE MATERIAL
Filed April 18, 1962　　　　　　　　　　　　　2 Sheets-Sheet 1

INVENTORS
CLARENCE E. RECKNOR
ROBERT L. MERCHANT
DON W. MILLER
DWAYNE O. MILLER
BY Beale and Jones
ATTORNEYS

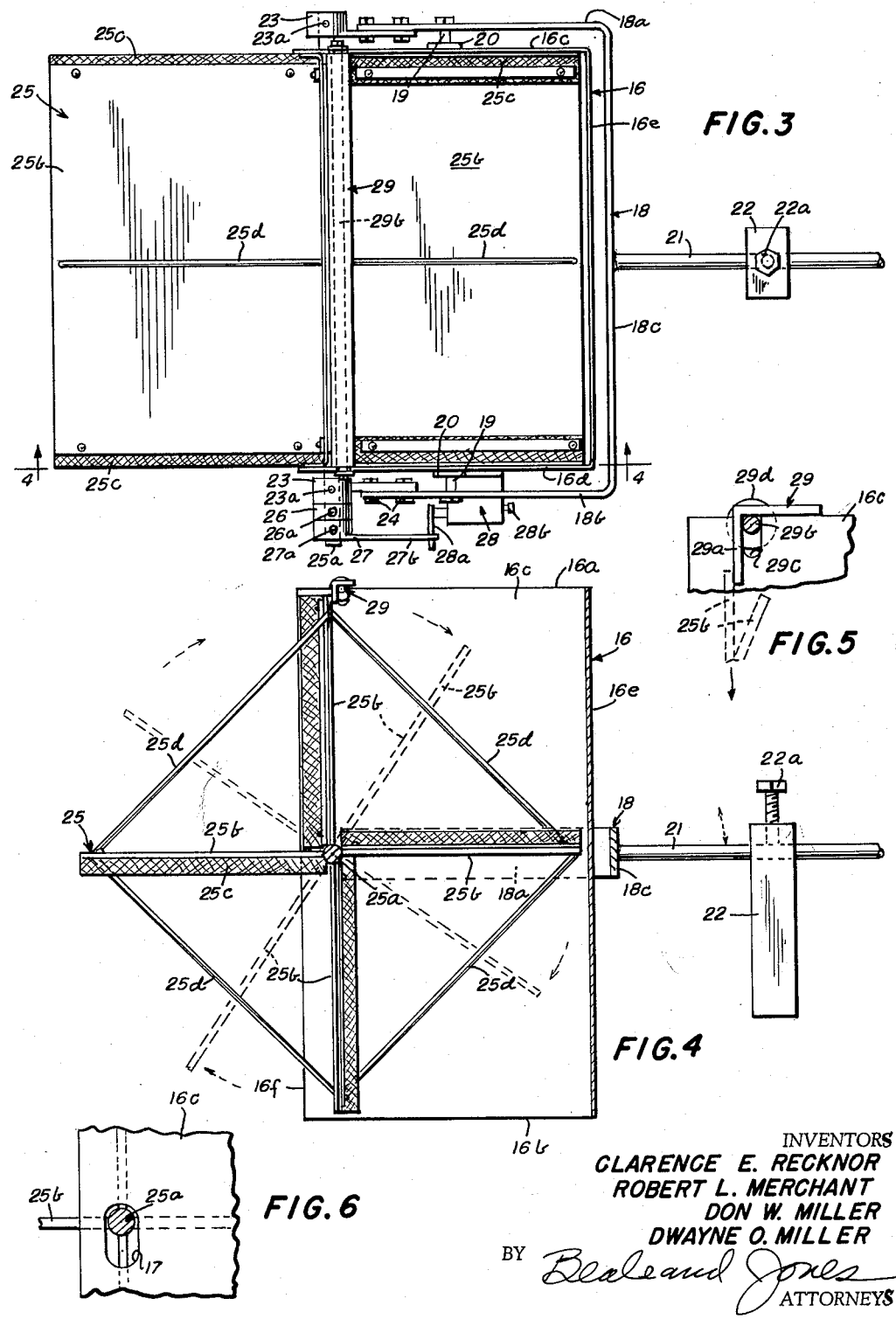

United States Patent Office 3,109,503
Patented Nov. 5, 1963

3,109,503
WEIGHING AND MEASURING APPARATUS FOR GRANULAR AND THE LIKE MATERIAL
Clarence E. Recknor, Robert L. Merchant, Don W. Miller, and Dwayne O. Miller, Polk, Nebr.
Filed Apr. 18, 1962, Ser. No. 188,313
4 Claims. (Cl. 177—24)

Our invention relates to an improved weighing and measuring apparatus for granular and the like material.

In handling feed material from overhead bins it is necessary to drive the truck under a spout thereof and to permit the desired amount of material to run down by gravity. In this operation there has been more or less guesswork in determining when a desired amount of material has been received in the truck. The determination of the desired batch or amount placed in the truck or conveying receptacle has been approximate, inefficient and wasteful.

It is an object of the invention to provide a weighing and measuring apparatus that may be readily attached to a spout of an overhead bin for accurately determining a desired amount of material for day to day rations of feed and to eliminate guesswork which results in waste of feed and possible loss by death of stock by under and overfeeding.

Another object of the invention is to provide an apparatus for weighing and measuring granular and the like material which is operable by the gravity flow of material being measured and without external power or other means.

A further object of the invention is to provide a weighing and measuring apparatus which has a chute member within which material is accurately measured as it flows therethrough by a rotating paddle gate mounted therewithin whose number of revolutions is automatically counted.

Still further objects and the entire scope of applicability of the present invention will become apparent from the detailed description given hereinafter. It should be understood, however, that the detailed description and specific example is given by way of illustration only and, while indicating a preferred embodiment of the invention, is not given by way of limitation, since various changes and modifications within the spirit and scope of the invention will become apparent to those skilled in the art from this detailed description.

For a more complete understanding of the nature and scope of the invention, reference is had to the drawings, the description which follows, and the appended claims.

In the drawings:

FIG. 3 is a top plan view of the apparatus on an enlarged scale;

FIG. 4 is a sectional view along line 4—4 of FIG. 3;

FIG. 5 is a view of the stop means at the top portion of the apparatus for the paddle gate and a fragmentary portion of the paddle gate and chute on an enlarged scale; and FIG. 6 is a fragmentary view of the paddle gate and its axle extending through the elongated slot in a side of the chute shown on about the same scale as FIG. 5.

Throughout the description, like reference numbers refer to similar parts.

Figure 1:
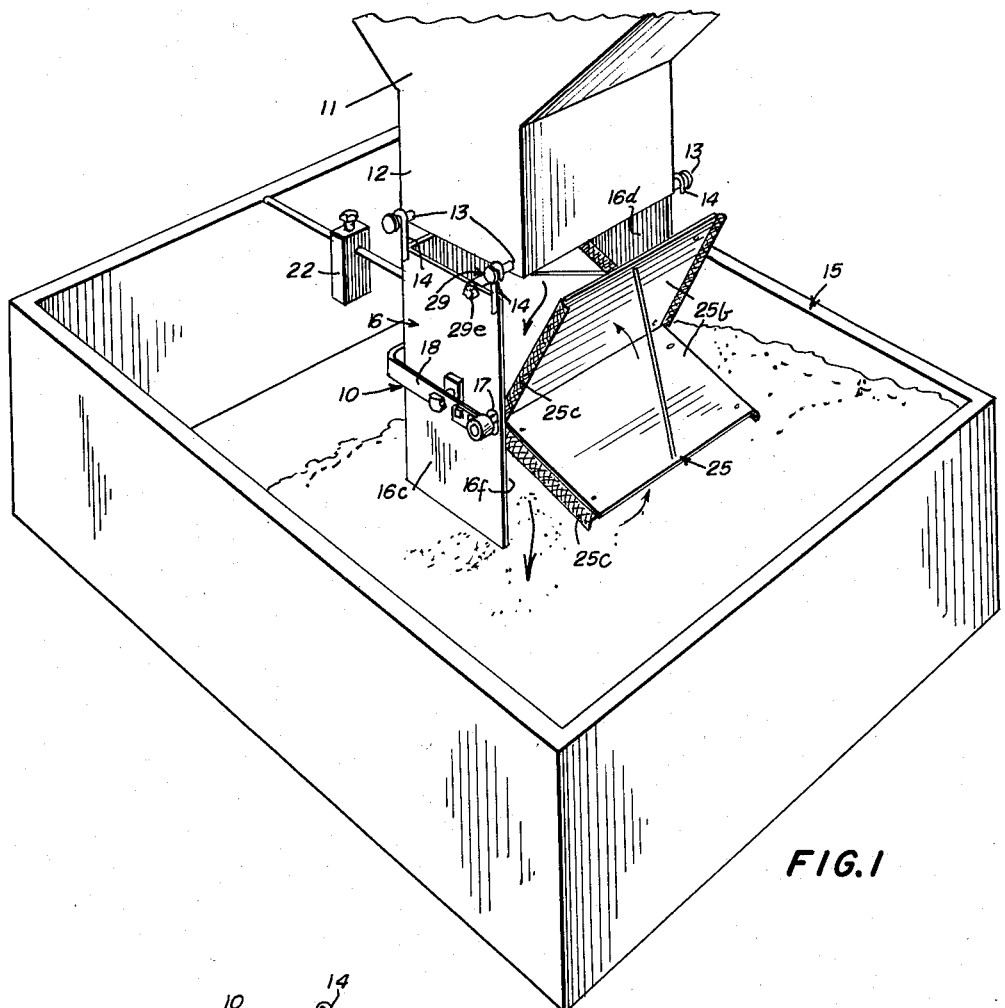
FIG. 1 is a perspective view of the apparatus shown attached to a spout of an overhead bin and dispensing into a truck body, for example, therebeneath.

The weighing and measuring apparatus according to the invention is generally indicated at 10. An overhead bin 11 has a spout 12 at the bottom thereof which may have a suitable shut-off gate therein (not shown). The spout 12 has outwardly projecting studs 13, four shown here at the corners, which are hooked over hooks 14 projecting up from the upper edge of the weighing and measuring apparatus 10. Below the weighing and measuring apparatus 10 there is positioned a receptacle 15 such as the body of a truck to receive a metered amount of the granular or the like material from bin 11.

The structural make up and features of the weighing and measuring apparatus 10 will be described. A vertically extending chute 16 of rectangular cross-sectional shape has two sides 16c and 16d, a back 16e, an opening in a face or front portion 16f opposite to the back 16e and which extends from the open upper end 16a to the lower open end 16b of the chute. In the two opposite sides 16c and 16d there are slotted apertures 17 to receive an axle of the paddle gate to be described.

Extending along the two sides 16c and 16d and back 16e is a bifurcated or bail member 18 having side arms 18a and 18b which are pivotally attached intermediate their ends by pivot bolts 19 screwed into suitable threaded apertures in reinforcing pads 20 attached to each side 16c and 16d. From the bight portion 18c of the bail 18 which extends along the back of the chute 16 there projects in a direction opposite to the face opening 16f a weight beam on which is slidably mounted a weight 22 having a securing setscrew 22a.

Attached to the ends of the arms 18a and 18b of the bail 18 and proximal to the open face portion 16f of the chute 16 are bearing members 23 as by bolts 24 so that the bearing portions thereof are adjacent the slotted apertures 17 in the adjacent sides of the chute. Each bearing members has an oil hole 23a projecting into the top thereof.

Figure 2:
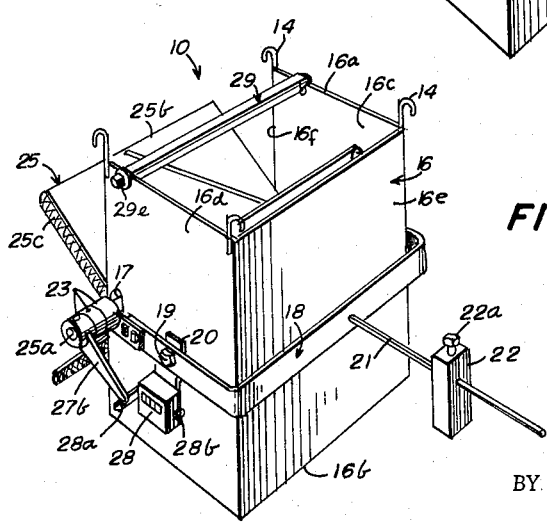
FIG. 2 is a perspective view of the weighing and measuring apparatus as viewed from the other side of FIG. 1 to show the counter-mechanism, and the bail carrying the weight beam.

A paddle gate assembly 25 extending into the chute 16 through the open face portion 16f has an axle 25a whose ends extend through the slots 17 in the sides 16c and 16d and into the bearings 23. At one end, as shown in FIGURES 2 and 3, the axle protrudes out further to receive a collar 26 secured by a setscrew 26a and outboard thereof an arm 27 secured by a setscrew 27a and having a radially projecting arm portion 27b.

Mounted on the side 16d of the chute adjacent the radial arm 27b is a recording counter 28 whose actuating arm 28a projects so as to be moved by the arm 27b for each revolution of the paddle gate 25. A reset knob 28b projects from one side of the revolution counter 28.

The paddle gate assembly 25 includes four equally spaced apart paddle elements 25b projecting radially from axle 25a to which they are secured as by welding so as to rotate therewith as a unit. These paddle elements 25b are here shown rectangular in shape and project into the chute 16 so as to receive the material thereon that is being metered. Along each edge of the paddle elements 25b are secured, as by rivets, gaskets 25c of flexible material such as canvas so as to seal with the adjacent sides 16c and 16d of the chute. Suitable stay rods 25d extend from one paddle element 25b to the next paddle element 25b and are secured as by welding; thereby a rigid paddle gate is provided.

A stop means 29 is attached to the chute 16 at its upper open end 16a adjacent the open face 16f. This stop means 29 serves as a stop for the pivotal and movable up and down paddle gate 25. The stop 29 here shown is an angle iron 29a having a leg depending to intercept the edge of the approaching paddle element 25b. This angle iron 29a extends from side 16c to side 16d of the chute and is supported by a rod member 29b to which it is welded. The rod member 29b extends through suitable slotted apertures 29c in the sides 16c and 16d of the chute and is threaded to receive a washer 29d and securing nut 29e so that there may be adjustment in the positioning of the angle iron portion 29a with respect to a paddle element 25a.

*Operation*

The weight 22 is set a selected distance on beam 21 so that a certain amount of granular or the like material is required to fall onto a paddle 25b that is positioned in the chute before the paddle gate assembly 25 will move bodily down in slot 17 as the measured material just balances the weight 22. As the paddle gate 25 moves bodily down along with the swing of the bail 18 which pivotally supports same, the next succeeding paddle element 25b moves down from abutting engagement with the stop 29 and the paddle element 25b in the chute carrying the measured load rotates clockwise as shown by the arrows and dumps its measured load into the lower portion of the chute 16. The material flows on out the lower open end 16b. As the load is dumped, the paddle gate 25 moves bodily upward and rotation thereof takes place. The above-mentioned next succeeding paddle moves into the chute to a load receiving position and the following paddle element comes into engagement with the stop 29 and the repeat of the operation takes place. As the paddle gate makes a revolution, its rigidly attached arm 27b actuates the accumulating counter to record a revolution. By suitably calibrating the apparatus, a certain number of indicated revolutions will correspond with a known measured amount of material.

There is herein provided a very efficient and easily installed weighing and measuring apparatus that is portable and weighs and measures material and also directs its flow.

We claim as our invention:

1. A weighing and measuring apparatus for granular and the like material comprising, in combination, a chute open at its upper end and having an outlet near its lower end, said chute having an opening in a face portion thereof, a balancing bail having side arms having pivotal attachments intermediate their ends to sides of said chute and extending about the chute to said open face portion, said side arms having a weighing beam member extending therefrom in a direction away from said open face portion, a weight slidably mounted on the beam, a paddle gate member having an axle across said open face portion and pivotally mounted in said side arms, said paddle gate having more than two spaced apart paddle elements extending radially from the axle, said paddle elements having flexible gasket material attached to their side edges for engagement with adjacent inside wall portions of the chute, stop means secured on said chute at a level above said axle and spaced therefrom a distance approximately equal to the radial dimension of said paddle elements; whereby material falling on a paddle element inside said chute causes said axle to move downwardly until said paddle element resting against said stop falls below said stop to permit said paddle gate to rotate and discharge the material held therein.

2. A weighing and measuring apparatus according to claim 1 having rods extending between the outer portions of adjacent paddle elements, and said stop means has at least a portion thereof located proximate to juncture where said rods attach to said elements.

3. A weighing and measuring apparatus for granular and the like material comprising, in combination, a chute open at its upper end and having an outlet near its lower end, said chute having an opening in a face portion thereof, a balancing bail having side arms having pivotal attachments intermediate their ends to sides of said chute and extending about the chute to said open face portion, said side arms having a weighing beam member extending therefrom in a direction away from said open face portion, a weight slidably mounted on the beam, a paddle gate member having an axle across said open face portion and pivotally mounted in said side arms, said paddle gate having more than two spaced apart paddle elements extending radially from the axle, an axle arm projecting radially from said paddle gate axle adjacent an end thereof, a counter attached to a side of said chute at a point proximate to one of said side arm pivotal attachments, a counter arm attached to said counter and extending in the path of said axle arm.

4. A weighing and measuring apparatus according to claim 3 wherein said counter arm is pivotally mounted about an axis approximately perpendicular to said axle.

References Cited in the file of this patent

UNITED STATES PATENTS

| | | |
|---|---|---|
| 405,689 | Applin | June 25, 1889 |
| 422,832 | Pollard | Mar. 4, 1890 |
| 572,504 | Dennis | Dec. 1, 1896 |
| 721,934 | Buckland | Mar. 3, 1903 |
| 1,242,794 | Gibson | Oct. 17, 1917 |
| 1,658,943 | Ruppert | Feb. 14, 1928 |
| 2,141,296 | Ferguson | Dec. 27, 1938 |
| 2,597,120 | McCargar | May 20, 1952 |
| 2,971,740 | Davis | Feb. 4, 1961 |